US012679956B2

(12) United States Patent (10) Patent No.: US 12,679,956 B2
Eichhorst et al. (45) Date of Patent: Jul. 14, 2026

(54) SULFUR-CROSSLINKABLE RUBBER-COATING MIXTURE

(71) Applicant: Continental Reifen Deutschland GmbH, Hannover (DE)

(72) Inventors: Christoph Eichhorst, Hanau (DE); Vipin Rajan, Ronnenberg (DE); Cornelia Schmaunz-Hirsch, Wunstorf (DE); Thomas Kramer, Herford (DE); Carla Recker, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 656 days.

(21) Appl. No.: 17/995,112

(22) PCT Filed: Dec. 2, 2020

(86) PCT No.: PCT/EP2020/084283
§ 371 (c)(1),
(2) Date: Sep. 29, 2022

(87) PCT Pub. No.: WO2021/197653
PCT Pub. Date: Oct. 7, 2021

(65) Prior Publication Data
US 2023/0151190 A1 May 18, 2023

(30) Foreign Application Priority Data
Mar. 31, 2020 (DE) ..................... 10 2020 204 152.0

(51) Int. Cl.
*C08L 7/00* (2006.01)
*B60C 1/00* (2006.01)
*B60C 9/00* (2006.01)

(52) U.S. Cl.
CPC .............. *C08L 7/00* (2013.01); *B60C 1/0041* (2013.01); *B60C 9/0007* (2013.01); *B60C 2001/0066* (2013.01); *B60C 2009/0021* (2013.01)

(58) Field of Classification Search
None
See application file for complete search history.

(56) References Cited

U.S. PATENT DOCUMENTS

| | | | | |
|---|---|---|---|---|
| 3,598,771 A | 8/1971 | Davis | | |
| 4,148,769 A * | 4/1979 | Swarts | C08L 21/00 | |
| | | | 524/399 | |
| 5,859,169 A * | 1/1999 | Burkhart | C08G 16/00 | |
| | | | 528/48 | |
| 8,759,471 B2 | 6/2014 | Schafer et al. | | |
| 2004/0002563 A1* | 1/2004 | Wentworth | C08K 5/109 | |
| | | | 524/100 | |
| 2004/0116592 A1 | 6/2004 | Durairaj et al. | | |
| 2008/0161477 A1 | 7/2008 | Cruse et al. | | |
| 2011/0112213 A1 | 5/2011 | Recker et al. | | |
| 2012/0095152 A1* | 4/2012 | Schafer | C08L 61/06 | |
| | | | 524/507 | |
| 2014/0166181 A1 | 6/2014 | Recker et al. | | |
| 2015/0314644 A1 | 11/2015 | Grassi et al. | | |
| 2017/0174823 A1 | 6/2017 | Weippert | | |
| 2020/0070579 A1* | 3/2020 | Tahon | C08L 7/00 | |
| 2021/0179748 A1* | 6/2021 | Tahon | C08K 3/06 | |

FOREIGN PATENT DOCUMENTS

| | | |
|---|---|---|
| CN | 105623188 A | 6/2016 |
| CN | 105980443 A | 9/2016 |
| CN | 110724071 A | 1/2020 |
| CN | 110872400 A | 3/2020 |
| DE | 102008037714 A1 | 2/2010 |
| DE | 102014211365 A1 | 12/2015 |
| DE | 102017211247 A1 | 1/2019 |
| EP | 0830423 B1 | 9/1999 |
| EP | 2065219 A1 | 6/2009 |
| EP | 2253649 A1 | 11/2010 |
| EP | 2674452 A1 | 12/2013 |
| EP | 1745079 B1 | 1/2014 |
| EP | 2432810 B1 | 1/2014 |
| EP | 2114961 B1 | 11/2014 |
| EP | 3620308 A1 | 3/2020 |
| EP | 3636700 A1 | 4/2020 |
| EP | 4126561 B1 | 5/2025 |

(Continued)

OTHER PUBLICATIONS

International Search Report and Written Opinion dated Feb. 25, 2021 of International Application PCT/EP2020/084283 on which this application is based.
Chinese Office Action dated Mar. 25, 2023 corresponding to Chinese Patent Application No. 202080099028.9.
Chinese Office Action dated Sep. 26, 2023 corresponding to Chinese Patent Application No. 202080099028.9.
India Examination Report dated Jul. 14, 2023 corresponding to India Patent Application No. 202217052237.

(Continued)

*Primary Examiner* — Katarzyna I Kolb

(74) *Attorney, Agent, or Firm* — Richard A. Wolf; Gregory Adams

(57) ABSTRACT

The present invention relates to a sulfur-crosslinkable rubberization mixture for metallic strength members containing at least one novolac resin comprising alkyl urethane units and produced by reaction of a phenolic compound, an aldehyde and a carbamate resin, wherein the carbamate resin is produced by reaction of alkyl urethane with an aldehyde, and at least one etherified melamine resin. The invention further relates to a pneumatic vehicle tire which comprises at least one such sulfur-crosslinked rubberization mixture. For improved durability of the rubberized strength members, the rubberization mixture contains at least one organic cobalt salt.

7 Claims, No Drawings

(56) References Cited

FOREIGN PATENT DOCUMENTS

| FR | 1320023 A | 3/1963 |
| GB | 1241080 A | 7/1971 |
| JP | 2012246412 A | 12/2012 |
| WO | 9640827 A1 | 12/1996 |
| WO | 9909036 A1 | 2/1999 |
| WO | 2005113609 A8 | 2/2006 |
| WO | 2008083241 A2 | 7/2008 |
| WO | 2008083242 A1 | 7/2008 |
| WO | 2008083243 A1 | 7/2008 |
| WO | 2008083244 A1 | 7/2008 |
| WO | 2008085453 A1 | 7/2008 |
| WO | 2010049216 A3 | 8/2010 |
| WO | 2010133622 A | 11/2010 |
| WO | 2010133622 A1 | 11/2010 |
| WO | 2017164293 A1 | 9/2017 |
| WO | 2019007570 A1 | 1/2019 |

OTHER PUBLICATIONS

Book Lexikon der Kautschuktechnik, Jochen Schnetger, 1991; ISBN 3-7785-1893-3, pp. 42-49.

BR Office Action dated Jun. 23, 2025 of counterpart Brazilian Application No. BR112022018084-5.

IN Notification of Hearing dated Jun. 11, 2025 of counterpart Indian Application No. 202217052237.

Rapra Technology, The Handbook of Rubber Bonding, 2001.

Allnex, Cyrez 963 Resin Liquid—Technical Datasheet, 2013.

Meyors Chemical Inc Limited, Meyors—RBB Data-Sheet, Dec. 1, 2009.

Cytec Surface Specialities, Alnovol PN 760/PAST—Prelimnary Technical data sheet, 2009.

EP Opposition dated Jan. 19, 2026 of counterpart European Application 20820352.1.

Fulton, W. Stephen, Steel Tire Cord-Rubber Adhesion, including the Contribution of Cobalt, July, Jan. 2005, Rubber Chemistry and Technology, vol. 78, Issue 3, pp. 426-457.

Allnex, Technical Data sheet for commercial product Cyrez CRA-200S, published Sep. 4, 2013.

Allnex, Technical Datasheet for commercial product Alnovol PN 760/PAST, published Sep. 15, 2014.

Shepherd Company, Commercial description of Cobalt Neodecanoate (CN), 20.5%, 2019. source: www.shepchem.com.

EP Opposition dated Feb. 12, 2026 of counterpart European Application 20820352.1.

* cited by examiner

SULFUR-CROSSLINKABLE RUBBER-COATING MIXTURE

The present invention relates to a sulfur-crosslinkable rubberization mixture for metallic strength members containing at least one novolac resin comprising alkyl urethane units and produced by reaction of a phenolic compound, an aldehyde and a carbamate resin, wherein the carbamate resin is produced by reaction of alkyl urethane with an aldehyde, and at least one etherified melamine resin. The invention further relates to a pneumatic vehicle tire which comprises at least one such sulfur-crosslinked rubberization mixture.

In sulfur-crosslinkable rubber mixtures used as rubberization mixtures for textile strength members such as rayon, polyamide and polyester it is customary to employ so-called methylene acceptor-methylene donor pairs in order to achieve not only bonding via the sulfur network but also to the adhesive impregnation of the textile strength member, generally an RFL dip. The RFL dip comprises resorcinol and formaldehyde or their pre-condensates.

Also marketed today as an alternative to RFL dips are maleic-functionalized polymers for treatment of textile fabric/textile strength members to achieve improved adhesion to the rubber mixtures. Such so-called RF-free dips are disclosed for example in EP 1745079 B1 and DE 102014211365 A1.

Methylene donors/formaldehyde donors employed are for example hexamethoxymethylmelamine (HMMM) and/or hexamethylenetetramine (HMT). They are very commonly used in the tire industry. Employed methylene acceptors include resorcinol and resorcinol equivalents or precondensates thereof as well as other phenols. The methylene donor and the methylene acceptor form a resin during the vulcanization process. In addition to the sulfur network a second network based on the methylene donor and the methylene acceptor, which enters into adhesive interaction with the adhesive impregnation of the strength member, is formed.

The use of methylene acceptor-methylene donor pairs is also known for rubberization mixtures for metallic strength members, in particular brass-plated steel cord. In the so-called direct adhesion process for brass-plated steel cord the rubberization mixture contains for example cobalt salts and a resorcinol-formaldehyde-silica system, wherein the formaldehyde generally derives from formaldehyde donors such as etherified melamine resins. Etherified melamine resins include, for example, hexamethoxymethylmelamine (HMMM) and hexamethylenetetramine (HMT). Adhesion is also improved through the use of reinforcer resins and the mixtures should contain a lot of sulfur and less accelerator to allow sufficient mechanical keying with the steel cord surface.

Resorcinol-based methylene acceptors have disadvantages with regard to occupational health and environmental protection. Resorcinol has a relatively high vapor pressure at the use temperatures of a rubberization mixture, with the result that it undergoes partial evaporation and condensation on cooler components during use. This results in large-scale contamination and thus in demanding cleanup requirements for the use environment. Furthermore, resorcinol is classified as hazardous to health and harmful to the environment. It may affect the central nervous system. Efforts are therefore being made to dispense with resorcinol as a methylene acceptor.

Mixtures that dispense with methylene acceptors are known for example from EP 0 830 423 B1 and EP 2 065 219 A1. However, these documents employ so-called self-condensing alkylated triazine resins with high imino and/or methylol functionality, wherein it is assumed that the high imino and/or methylol functionality allows these resins to self-condense to form a network required for adhesion without any need for a methylene acceptor.

EP 2 674 452 A1 discloses using a reactive phenolic resin, in particular a phenolic resin modified with a vegetable and/or animal oil, an unsaturated oil and/or aromatic hydrocarbon, as a methylene acceptor in a sulfur-crosslinkable rubberization mixture for textile strength members in pneumatic vehicle tires. This results in good adhesion and less contamination during mixture production while simultaneously making it possible to dispense with health-hazardous and environmentally harmful resorcinol during use.

It has been found that the abovementioned methylene acceptors do not result in the desired adhesion and stiffness in all applications, in particular all tire body mixtures. Resorcinol residues are also often still present in the resins and entail the known hazards to health and the environment during their use.

EP 2 432 810 B1 relates to adhesion-improving rubberization mixtures for rubber articles containing at least one novolac resin, which comprises alkyl urethane units and is produced by reaction of a phenolic compound, an aldehyde and a carbamate resin, wherein the carbamate resin is produced by reaction of alkyl urethane with an aldehyde, and at least one etherified melamine resin. The mixtures should feature good hardness, tensile strength and adhesion while dispensing with resorcinol-based systems which are hazardous to health and the environment. The mixtures described in EP 2 432 810 B1 comprise 3 phr of a butyl carbamate-functionalized phenol-formaldehyde resin and 3 phr of hexamethoxymethylmelamine (HMMM).

It is an object of the present invention to provide a sulfur-crosslinkable rubberization mixture which exhibits improved adhesion to metallic strength members and thus results in an improvement in terms of the durability of the rubberized strength members.

The object is achieved according to the invention when the rubberization mixture comprises at least one organic cobalt salt.

It has surprisingly been found that the addition of cobalt salts markedly improves the adhesion between the metallic strength members and the rubberization mixture.

According to an advantageous development of the invention the rubberization mixture contains

- less than 2.5 phr (parts by weight, based on 100 parts by weight of the total rubbers in the mixture), preferably 1.2 to 1.8 phr, of at least one novolac resin comprising alkyl urethane units and produced by reaction of a phenolic compound, an aldehyde and a carbamate resin, wherein the carbamate resin is produced by reaction of alkyl urethane with an aldehyde, and
- less than 2.5 phr, preferably 1.2 to 1.8 phr, of at least one etherified melamine resin.

The unit "phr" (parts per hundred parts of rubber by weight) used in this document is the standard unit of quantity for mixture recipes in the rubber industry. The dosage of the parts by weight of the individual substances is always based here on 100 parts by weight of the total mass of all rubbers present in the mixture. The mass of all rubbers present in the mixture sums to 100.

Such small amounts of the special novolac resin and the etherified melamine resin make it possible to obtain rubberization mixtures featuring improved tensile strength and breaking elongation after vulcanization. This results in improved durability of the rubberized strength members and thus of the rubber products comprising these rubberized strength members. Such rubberization mixtures also make it possible to achieve a shorter vulcanization time.

In order to achieve particularly good results in terms of adhesion and stress-strain behavior it has proven advantageous when the proportions of the novolac resin and of the etherified melamine resin sum to less than 5 phr, preferably 2.5 to 3.5 phr.

The ratio of the novolac resin to the etherified melamine resin is preferably 1:1.5 to 1.5:1, particularly preferably 1:1.

If in accordance with an advantageous development the rubberization mixture is free from resorcinol as an adhesive the mixtures are also more environmentally friendly and less hazardous to health during use.

The novolac resin is produced by reaction of a phenolic compound with an aldehyde and a carbamate resin. The phenolic compound may be selected from the group consisting of phenol, o-, m- and p-cresol and o-, m- and p-monoalkylphenols with alkyl radicals having up to 18 carbon atoms. The phenolic compound is preferably phenol. The aldehyde may be selected from the group consisting of formaldehyde, acetaldehyde, propionaldehyde, butyraldehyde and isobutyraldehyde. The aldehyde is preferably formaldehyde.

The carbamate resin is produced by reaction of an alkyl urethane with an aldehyde. The alkyl urethane may be selected from the group consisting of ethyl urethane, butyl urethane, 2-ethylhexyl urethane and decyl urethane. The alkyl urethane is preferably butyl urethane.

The aldehyde for the carbamate resin may be selected from the group consisting of formaldehyde, acetaldehyde, propionaldehyde, butyraldehyde and isobutyraldehyde. The aldehyde is preferably formaldehyde.

The aldehydes for the novolac resin and the carbamate resin may be identical or different aldehydes.

The rubberization mixture preferably employs a novolac resin produced from phenol, formaldehyde and a carbamate resin made from butyl urethane and formaldehyde (butyl carbamate-functionalized phenol-formaldehyde resin).

The rubberization mixture contains at least one etherified melamine resin which constructs a secondary network for good adhesion and hardness.

The etherified melamine resin is preferably hexamethoxymethylmelamine (HMMM). This is a customary commercially available melamine resin which forms a good resin network. HMMM is employed as a technical grade product for example—often on an inert carrier—with a degree of methylation of <6.

The rubberization mixture according to the invention additionally contains at least one organic cobalt salt. This may be selected for example from cobalt stearate, borate, borate-alkanoates, naphthenate, rhodinate, octoate, adipate etc. It is also possible to employ two or more cobalt salts in the mixture.

The rubberization mixture preferably contains 0.2 to 2 phr of the organic cobalt salt.

The sulfur-crosslinkable rubber mixture contains further constituents customary in the rubber industry, in particular at least one rubber.

Employable rubbers include diene rubbers. Diene rubbers include all rubbers having an unsaturated carbon chain which at least partially derive from conjugated dienes.

The rubber mixture may contain polyisoprene (IR, NR) as the diene rubber. This may be either cis-1,4-polyisoprene or 3,4-polyisoprene. Preference is given, however, to the use of cis-1,4-polyisoprenes with a cis-1,4 content >90% by weight. Such a polyisoprene is firstly obtainable by stereospecific polymerization in solution with Ziegler-Natta catalysts or using finely divided lithium alkyls. Secondly, natural rubber (NR) is one such cis-1,4-polyisoprene; the cis-1,4 content in the natural rubber is greater than 99% by weight. Natural rubber is understood to mean rubber that can be obtained by harvesting from sources such as rubber trees (Hevea *brasiliensis*) or non-rubber tree sources (for example guayule or dandelion (e.g. *Taraxacum koksaghyz*)).

If the rubber mixture contains polybutadiene (BR) as the diene rubber, this may be cis-1,4-polybutadiene. Preference is given to the use of cis-1,4-polybutadiene with a cis-1,4 content greater than 90% by weight, which can be prepared, for example, by solution polymerization in the presence of catalysts of the rare earth type.

Further diene rubbers that may be employed include vinyl-polybutadienes and styrene-butadiene copolymers. The vinyl-polybutadienes and styrene-butadiene copolymers may be solution-polymerized (styrene)-butadiene copolymers (S-(S)BR) having a styrene content, based on the polymer, of about 0% to 45% by weight and a vinyl content (content of 1,2-bonded butadiene, based on the total polymer) of 10% to 90% by weight, which may be produced using lithium alkyls in organic solvent for example. The S-(SB)R may also be coupled and endgroup-modified. However, it is also possible to employ emulsion-polymerized styrene-butadiene copolymers (E-SBR) and mixtures of E-SBR and S-(S)BR. The styrene content of the E-SBR is about 15% to 50% by weight, and it is possible to use the products known from the prior art that have been obtained by copolymerization of styrene and 1,3-butadiene in aqueous emulsion.

The diene rubbers used in the mixture, especially styrene-butadiene copolymers, can also be used in partly or fully functionalized form. The functionalization can be effected with groups which can interact with the fillers used, especially with fillers bearing OH groups. These may be functionalizations with hydroxyl groups and/or epoxy groups and/or siloxane groups and/or amino groups and/or phthalocyanine groups and/or carboxy groups and/or silane sulfide groups. Alternatively or in addition the diene rubbers may also be coupled.

However, in addition to the recited diene rubbers the mixture may also contain other rubber types such as for example styrene-isoprene-butadiene terpolymer, butyl rubber, halobutyl rubber or ethylene-propylenediene-diene rubber (EPDM).

Regenerate (reclaim) may also be added to the rubber mixture as a processing aid and to make the mixture more cost-effective.

The rubber mixture may comprise different fillers, such as carbon blacks, silicas, aluminosilicates, chalk, starch, magnesium oxide, titanium dioxide or rubber gels, in customary amounts, where the fillers may be used in combination.

If carbon black is used in the rubber mixture, the types used are preferably those having a CTAB surface area (to ASTM D 3765) of more than 30 $m^2/g$. These can be mixed in in a simple manner and ensure low buildup of heat.

If silicas are present in the mixture, they may be the silicas that are customary for tire rubber mixtures. It is particularly preferable when a finely divided, precipitated silica is used, having a CTAB surface area (to ASTM D 3765) of 30 to 350 $m^2/g$, preferably of 110 to 250 $m^2/g$. Silicas used may be either conventional silicas, such as those of the VN3 type (trade name) from Evonik, or highly dispersible silicas known as HD silicas (e.g. Ultrasil 7000 from Evonik).

If the rubber mixture contains silica or other polar fillers, silane coupling agents may be added to the mixture for improvement of processability and for binding of the polar filler to the rubber. The silane coupling agents react with the surface silanol groups of the silica or other polar groups during the mixing of the rubber/the rubber mixture (in situ) or in the context of a pretreatment (premodification) even before addition of the filler to the rubber. Silane coupling agents that may be used here include any silane coupling agents known to those skilled in the art for use in rubber mixtures. Such coupling agents known from the prior art are bifunctional organosilanes having at least one alkoxy, cycloalkoxy or phenoxy group as a leaving group on the silicon atom and having, as another functionality, a group that, after cleavage if necessary, can enter into a chemical reaction with the double bonds of the polymer. The latter group may for example comprise the following chemical groups: —SCN, —SH, —NH$_2$ or —S$_x$— (with x=2-8). Silane coupling agents that may be used thus include, for example, 3-mercaptopropyltriethoxysilane, 3-thiocyanato-propyltrimethoxysilane or 3,3'-bis(triethoxysilylpropyl) polysulfides having 2 to 8 sulfur atoms, for example 3,3'-bis(triethoxysilylpropyl) tetrasulfide (TESPT), the corresponding disulfide, or else mixtures of the sulfides having 1 to 8 sulfur atoms with different contents of the various sulfides. The silane coupling agents may also be added here as a mixture with industrial carbon black, for example TESPT to carbon black (trade name: X50S from Evonik). Blocked mercaptosilanes as known for example from WO 99/09036 may also be used as a silane coupling agent. It is also possible to use silanes as described in WO 2008/083241 A1, WO 2008/083242 A1, WO 2008/083243 A1 and WO 2008/083244 A1. It is also possible to use, for example, silanes that are sold under the NXT® name in a number of variants by Momentive, USA, or those that are sold under the VP Si 363 name by Evonik Industries. Also usable are "silated core polysulfides" (SCPs, polysulfides with a sily-lated core), which are described, for example, in US 20080161477 A1 and EP 2 114 961 B1.

Furthermore, the rubber mixture according to the invention may comprise standard additives in customary proportions by weight. These additives include plasticizers, for example glycerols, factice, hydrocarbon resins, aromatic, naphthenic or paraffinic mineral oil plasticizers (for example MES (mild extraction solvate) or TDAE (treated distillate aromatic extract), oils based on renewable raw materials (for example rapeseed oil, terpene oils (for example orange oils) or factice), so-called BTL oils (as disclosed in DE 10 2008 037714 A1) or liquid polymers (for example liquid polyb-utadiene); aging stabilizers, for example N-phenyl-N'-(1,3-dimethylbutyl)-p-phenylendiamine (6PPD), N-isopropyl-N'-phenyl-p-phenylendiamine (IPPD), 2,2,4-trimethyl-1,2-dihydroquinoline (TMQ) and other substances, as known for example from J. Schnetger, Lexikon der Kautschuktechnik, 2nd edition, Hüthig Buch Verlag, Heidelberg, 1991, pages 42-48, activators, for example zinc oxide and fatty acids (for example stearic acid), waxes, tackifier resins, for example hydrocarbon resins and colophony, and mastication aids, for example 2,2'-dibenzamidodiphenyldisulfide (DBD).

The vulcanization is performed in the presence of sulfur and/or sulfur donors, and some sulfur donors can simulta-neously act as vulcanization accelerators. Sulfur or sulfur donors are added to the rubber mixture in the amounts commonly used by those skilled in the art (0.4 to 8 phr) in the last mixing step. To improve adhesion, in particular to textile strength members, the rubberization mixture prefer-ably contains less than 5 phr of sulfur.

In addition, the rubber mixture may comprise vulcaniza-tion-influencing substances such as vulcanization accelera-tors, vulcanization retarders and vulcanization activators in customary amounts, in order to control the time required and/or the temperature required in the vulcanization and to improve the vulcanizate properties. The vulcanization accel-erator may, for example, be selected from the following groups of accelerators: thiazole accelerators, for example 2-mercaptobenzothiazole, sulfenamide accelerators, for example benzothiazyl-2-cyclohexylsulfenamide (CBS) ben-zothiazyl-2-tert-butylsulfenamide (TBBS) and benzothi-azyl-2-dicyclohexylsulfenamide (DCBS), guanidine accel-erators, for example N,N'-diphenylguanidine (DPG), dithiocarbamate accelerators, for example zinc dibenzyldi-thiocarbamate, disulfides, thiophosphates. The accelerators can also be used in combination with one another, which can give rise to synergistic effects.

It is also possible to use further network-forming systems, for example Vulkuren®, Duralink® or Perkalink®, or sys-tems as described in WO 2010/049261 A2 in the rubberizing mixture.

The vulcanization accelerators may be used in customary amounts. In an advantageous development of the invention the rubberization mixture contains as vulcanization accel-erator 0.8 to 1.5 phr of benzothiazyl-2-dicyclohexylsulfena-mide (DCBS) and less than 0.5 phr of other vulcanization accelerators. A further improvement in adhesion can be achieved using DCBS as the vulcanization accelerator.

Production of the rubber mixture according to the inven-tion is carried out in conventional fashion, wherein it gen-erally comprises initially producing a base mixture contain-ing all the constituents with the exception of the vulcanization system (sulfur and vulcanization-influencing substances) in one or more mixing stages and subsequently producing the finished mixture by adding the vulcanization system. The mixture is then subjected to further processing.

The rubber mixture may be employed in a very wide variety of rubber products containing strength members. These rubber products may include for example drive belts, conveyor belts, hoses, rubberized fabrics or air springs.

The rubber mixture is preferably employed in pneumatic vehicle tires. It may be employed therein for example as a rubberization for textile or metallic strength members. The textile strength members may for example be made of aramid, polyester, polyamide, rayon or hybrid cords made of these materials.

The rubber mixture may be employed for rubberization of a very wide variety of tire components such as the bead core, the bead covers, the bead reinforcers, the belt, the carcass or the belt bandages but the rubber mixture may also be used for other mixtures in proximity to strength members such as the apex, the squeegee, the belt edge pads, the shoulder pads, the undertreads or other body mixtures, wherein it is also possible for two or more components in a tire to be provided with the mixture according to the invention. The production of the pneumatic vehicle tires according to the invention is carried out according to the process known to those skilled in the art.

It is preferable when the rubberization mixture is employed as a carcass rubberization where the good adhe-sion values between the strength member and the rubber-ization mixture result in a long lifetime of the pneumatic vehicle tire.

Alternatively or in addition, the rubber mixture may also be used as a belt rubberization mixture which in turn has a positive influence on the lifetime of the pneumatic vehicle tire.

The invention shall now be more particularly elucidated with reference to the tables which follow.

Mixtures for a rubberization for steel cord are reported in table 1.

In the mixtures of table 1 the adhesive resorcinol was replaced with a novolac resin produced from phenol, formaldehyde and carbamate resin made from butyl urethane and formaldehyde (butyl carbamate-functionalized phenol-formaldehyde resin) and the amounts thereof as well as Elongation at break at room temperature according to DIN 53504

In addition, the mixtures from table 1 were used to conduct adhesion experiments on brass-plated steel cord (2×0.3 HT) according to ASTM 2229/D1871 without aging (vulcanization: 20 min at 160° C., embedding length in the rubberization mixture: 10 mm, pull-out speed: 125 mm/min). The pull-out force and coverage were determined. For the pull-out force, the value of mixture 1 was taken as 100%; the values of the other mixtures were based on mixture 1.

TABLE 1

| | Unit | 1 | 2 | 3 | 4 | 5 | 6 | 7 | 8 |
|---|---|---|---|---|---|---|---|---|---|
| Constituents | | | | | | | | | |
| Natural rubber | phr | 100 | 100 | 100 | 100 | 100 | 100 | 100 | 100 |
| Carbon black | phr | 55 | 55 | 55 | 55 | 55 | 55 | 55 | 55 |
| Silica | phr | 15 | 15 | 15 | 15 | 15 | 15 | 15 | 15 |
| Plasticizers, aging stabilizers | phr | 5 | 5 | 5 | 5 | 5 | 5 | 5 | 5 |
| Vulcanization activators | phr | 10 | 10 | 10 | 10 | 10 | 10 | 10 | 10 |
| Cobalt stearate | phr | — | — | 1.3 | 1.3 | 1.3 | 1.3 | 1.3 | 1.3 |
| Resorcinol | phr | 3 | — | 3 | — | 3 | — | 1.5 | — |
| Butyl carbamate-functionalized phenol-formaldehyde resin[a] | phr | — | 3 | — | 3 | — | 3 | — | 1.5 |
| HMMM[b] | phr | 4.61 | 4.61 | 4.61 | 4.61 | 4.61 | 4.61 | 2.31 | 2.31 |
| Accelerator TBBS | phr | 0.6 | 0.6 | 0.6 | 0.6 | — | — | — | — |
| Accelerator DCBS | phr | 0.6 | 0.6 | 0.6 | 0.6 | 1.2 | 1.2 | 1.2 | 1.2 |
| Sulfur | phr | 6 | 6 | 6 | 6 | 6 | 6 | 6 | 6 |
| Properties | | | | | | | | | |
| $t_{90}$ | min | 8.2 | 13.4 | 7.3 | 10.3 | 8.1 | 11.7 | 8.5 | 9.4 |
| Hardness at RT | Shore A | 75 | 78 | 78 | 80 | 76 | 78 | 75 | 75 |
| Rebound resilience at 70° C. | % | 50 | 51 | 50 | 48 | 49 | 49 | 50 | 49 |
| Tensile strength at RT | MPa | 15.8 | 17.7 | 15.9 | 18 | 16 | 17 | 17 | 19 |
| Elongation at break | % | 326 | 358 | 313 | 361 | 320 | 366 | 350 | 424 |
| Pull-outforce (unaged) | % | 100 | 97 | 102 | 115 | 109 | 120 | 122 | 125 |
| Coverage (unaged) | % | 95 | 91 | 94 | 93 | 95 | 94 | 96 | 95 |

[a]Alnovol ® PN 760/Past, Allnex Netherlands B. V.
[b]Hexamethoxymethylmelamine 65% on silica those of HMMM were varied. An organic cobalt salt was also added to the inventive mixtures. The vulcanization accelerators were also varied.

Mixture production was carried out under customary conditions to produce a base mixture and subsequently the finished mixture in a laboratory tangential mixture.

The conversion times for 90% conversion ($t_{90}$, complete vulcanization time) were determined using a rotorless vulcameter (MDR=moving disc rheometer) according to DIN 53 529 for vulcanization at 160° C.

The mixtures were used to produce test specimens by optimal vulcanization under pressure at 160° C., and these test specimens were used to determine the material properties typical for the rubber industry by the test methods specified hereinafter.

Shore A hardness at room temperature according to DIN ISO 7619-1
Rebound resilience at 70° C. according to DIN 53 512
Tensile strength at room temperature according to DIN 53 504

The inventive steel cord rubberizations of table 1 show a marked improvement in adhesion when using butyl carbamate-functionalized phenol-formaldehyde resin and HMMM in combination with cobalt stearate (see mixture 4). Furthermore, the heating time $t_{90}$ can be reduced, thus resulting in cost and time savings in the production of the products. Adhesion can be further improved when between 0.8 to 1.5 phr of benzothiazyl-2-dicyclohexylsulfenamide (DCBS) and less than 0.5 phr of other vulcanization accelerators are employed according to mixture 6.

Reducing the amounts of butyl carbamate-functionalized phenol-formaldehyde resin and HMMM (see mixture 8) results in a further improvement in adhesion while surprisingly greatly enhancing elongation at break characteristics and tensile strength at the same time. This results in improved durability of the rubberized strength members and the products produced therefrom.

The invention claimed is:

1. A sulfur-crosslinkable rubberization mixture for metallic strength members, the mixture comprising:

from 1.2 phr to 1.8 phr of at least one butyl carbamate-functionalized phenol-formaldehyde novolac resin comprising alkyl urethane units and produced by reaction of phenol, formaldehyde and a carbamate resin, wherein the carbamate resin is produced by reaction of butyl urethane with formaldehyde; and, from 1.2 phr to 1.8 phr of hexamethoxymethylmelamine (HMMM) resin;

from 0.8 to 1.5 phr of benzothiazyl-2-dicyclohexylsulfenamide (DCBS) as a vulcanization accelerator, and less than 0.5 phr of any other vulcanization accelerators, wherein the novolac resin and the HMMM resin are present in a weight ratio of 1:1.5 to 1.5:1, and the novolac resin and the HMMM together are incorporated in an amount of 2.5 phr to 3.5 phr, wherein the mixture contains from 0.2 to 2 phr of at least one organic cobalt salt, and wherein the mixture is free from resorcinol.

2. A pneumatic vehicle tire comprising the sulfur-cross-linked rubberization mixture as claimed in claim 1.

3. The pneumatic vehicle tire as claimed in claim 2, wherein the pneumatic vehicle tire comprises a carcass rubberization composed of the sulfur-crosslinkable rubberization mixture.

4. The pneumatic vehicle tire as claimed in claim 2, wherein the pneumatic vehicle tire comprises a belt including the sulfur-crosslinkable rubberization mixture and brass-coated steel strength members adhered to the rubberization mixture.

5. The pneumatic vehicle tire according to claim 4:
the mixture further comprising:
from 0.4 to 8 phr of sulfur.

6. The pneumatic vehicle tire according to claim 5, wherein the novolac resin and the HMMM resin are incorporated into the composition in a weight ratio of 1:1.

7. The pneumatic vehicle tire according to claim 2, wherein the rubberization mixture contains only DCBS as the vulcanization accelerator and is devoid of any other vulcanization accelerators.

* * * * *